Sept. 10, 1946.                B. M. HARRISON                    2,407,270
                             SUBMARINE SIGNALING
                    Filed Sept. 23, 1938          2 Sheets-Sheet 1
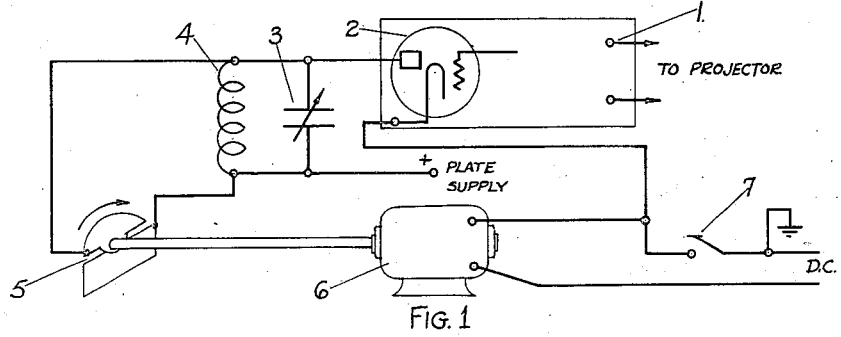
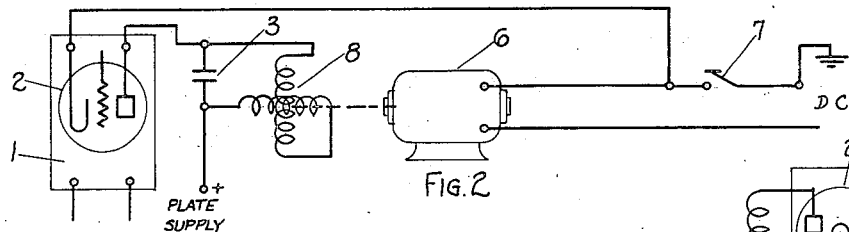
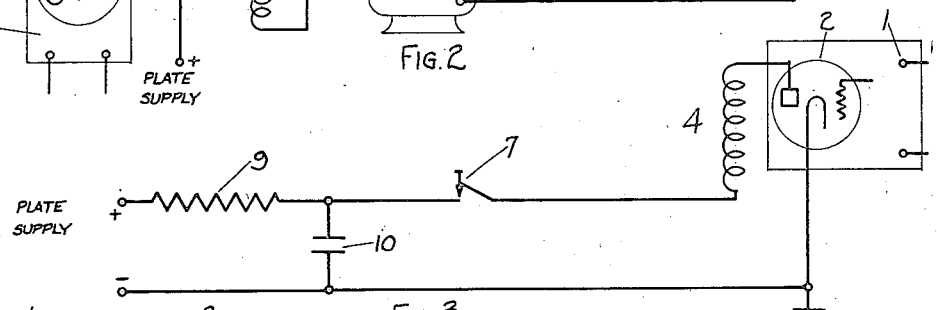
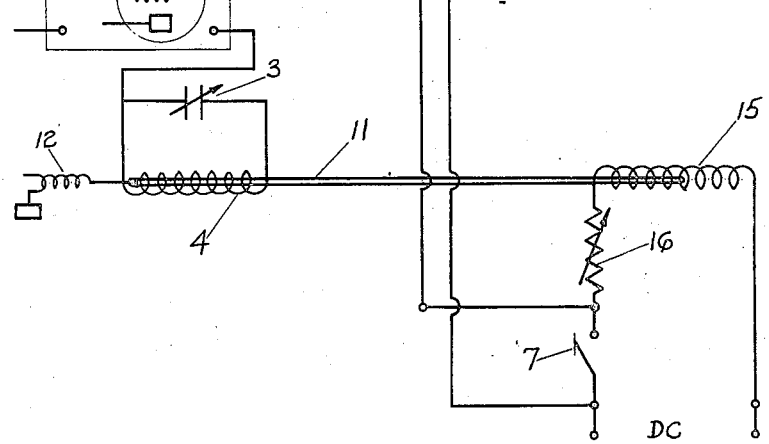
INVENTOR.
BERTRAM M. HARRISON
BY
ATTORNEY.

INVENTOR.
BERTRAM M. HARRISON
BY
ATTORNEY.

Patented Sept. 10, 1946

2,407,270

UNITED STATES PATENT OFFICE 2,407,270

SUBMARINE SIGNALING

Bertram M. Harrison, Newton Highlands, Mass., assignor, by mesne assignments, to Submarine Signal Company, Boston, Mass., a corporation of Delaware Application September 23, 1938, Serial No. 231,391

1 Claim. (Cl. 250—36)

The present invention relates to sound ranging and more particularly to sound ranging systems in which the transmitted signal is continuously varying in frequency.

In my copending application Serial No. 174,081, filed November 11, 1937, I have set forth a system of sound ranging for the detection and location of objects in the water. In this system I provided that the transmitted compressional wave signal, which may be of supersonic frequency, should be continuously modulated in frequency and of a predetermined time length and I described a mechanical and an electrical circuit for producing a suitable current for operating a compressional wave projector to produce a signal of the desired characteristics.

Figure 5:
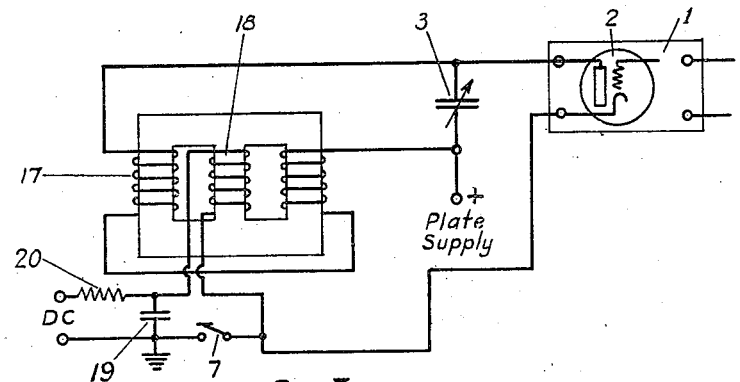
Figure 6:
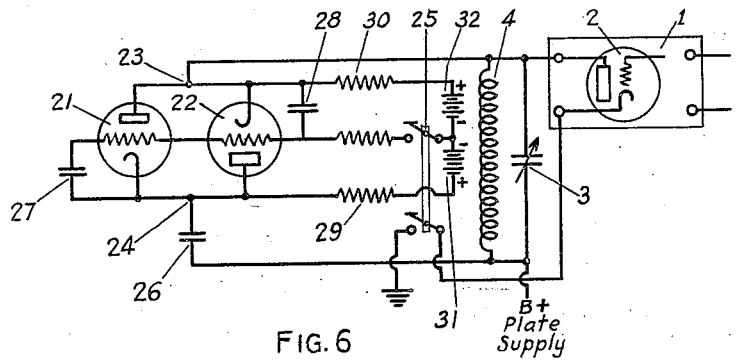
Figure 7:
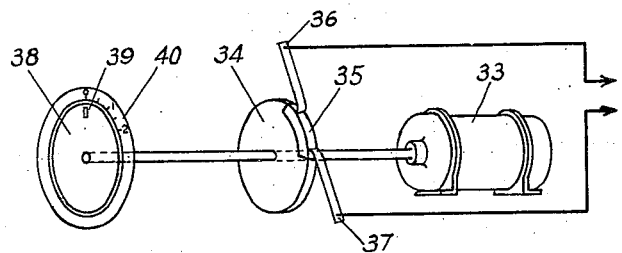

The present invention relates to other arrangements for the production of such currents and it will be best understood with reference to the accompanying drawings in which Fig. 1 is a schematic diagram of the circuit disclosed in my said copending application; Fig. 2 is a modification of the circuit shown in Fig. 1; Fig. 3 is a modified electrical circuit in accordance with the invention; Figs. 4, 5 and 6 are further modifications of the electrical circuit; and Fig. 7 is a schematic illustration of an automatic keying device.

In the circuit arrangement according to Fig. 1 a driver 1 for supplying power to the projector is provided with an oscillator 2 in whose plate circuit is a tuning condenser 3 and inductance 4. In parallel with the condenser 3 is a variable condenser 5 whose rotor plates may be rotated through a single revolution or a portion thereof by the motor 6, thereby varying the frequency of the driver and consequently the frequency of the signal emitted by the projector. The entire system is controlled by the key 7 which when depressed supplies plate voltage to the oscillator tube and simultaneously supplies current to the motor 6 to rotate the condenser 5 through a single revolution.

According to the arrangement shown in Fig. 2 the oscillator tube has in its plate circuit a tuning condenser 3 and a variable inductance or variometer 8, the latter being driven by the motor 6. The keying circuit controlled by the key 7 is arranged to operate the motor to produce a progressive change in the inductance of the device 8 within predetermined limits whereby the frequency of the driver and consequently of the signal transmitted by the projector is varied through a predetermined frequency band. If desired, a mechanical contact may be arranged to open the keying circuit when the inductance 8 reaches a position corresponding to the desired final frequency.

According to the arrangement shown in Fig. 3 the oscillator tube 2 has its frequency controlled by a condenser resistance combination. The condenser 10 in series with the resistance 9 is connected across the plate supply source so that the condenser is charged thereby. When the key 7 is closed, the condenser discharges through the inductance 4 gradually decreasing the plate voltage of the tube from its maximum value and thereby changing its frequency.

In the modification shown in Fig. 4 the inductance coil 4 in the plate circuit of the oscillator tube 2 is provided with a core in the form of a magnetic rod 11 which is tensioned by the spring 12 to remain inside the coil 4.

Surrounding the other end of the rod is a solenoid 15 supplied with current from the direct current source when the key 7 is depressed. When the coil 15 is so energized, the rod 11 is withdrawn from the coil 4, thereby changing its inductance and consequently the frequency of the driver. The rate of change of frequency and the frequency limits may be controlled by adjusting the current supplied to the solenoid 15 as, for instance, by means of the variable resistance 16.

In the frequency sweep circuit shown in Fig. 5 the oscillator tuning inductance is in the form of an iron cored coil 17 whose inductance value is changed by varying the current in a coil 18 wound upon the same core. The latter coil is supplied with current from a condenser 19 which is charged from the line through the resistance 20 and discharges through the coil 18 when the key 7 is closed. The leg of the core upon which the coil 18 is wound is made of smaller dimensions than the legs upon which the coil 17 is wound so that saturation will take place whereby a considerable change in the inductance of the coil 17 may be obtained, thereby producing a change in the frequency of the oscillator tube.

In the modification shown in Fig. 6 a pair of vacuum tubes are used to control the capacity in the oscillator plate circuit. Two vacuum tubes 21 and 22 are connected in parallel reversed relation to provide a conductive path in both directions between the points 23 and 24. These tubes are arranged to be conductive while the key 25 is open. Under these conditions the capacity in the plate circuits of the oscillator tube comprises the condenser 3 in parallel with condenser 26. When the key 25 is closed, condensers 27 and 28 gradually become charged through resistances 29 and 30, respectively, from the batteries 31 and 32, respectively, whereby the grids of the tubes 21 and 22 become progressively more negative. Conduction through the tubes is thereby gradually cut off, resulting finally in the condensers 26, 27 and 28 being in effect connected together, in series. The capacitance in the oscillator plate circuit has therefore gradually changed whereby the frequency of the oscillator has also changed. By varying the values of the condensers and the resistances or the voltage of the condenser-charging batteries, practically any desired frequency change can be obtained in the driver. The key 25, it should be noted, must be a double contact key so that the oscillator plate circuit is supplied with plate voltage simultaneously with the beginning of charge of condensers 27 and 28.

In order to provide for a signal of predetermined time length and which will vary between predetermined frequency limits it is preferable, particularly with the arrangements of Figs. 3, 4, 5 and 6, to use an automatic mechanical keying device which may, for example, be like that shown in Fig. 7. In this figure a constant speed motor 33 drives an insulating disc 34 having a conducting segment 35 upon which bear two brushes 36 and 37 which may represent the two terminals of the key 7. In the case of the double contact key required by Fig. 6 an additional pair of brushes may be provided or the brushes shown may be used to close an auxiliary relay which would then take the place of the key 25 in Fig. 6. The length of the transmitted signal may be controlled by varying the separation of the brushes 36 and 37 with respect to the length of the conducting segment 35 and the motor's speed.

If desired, the motor 33 may simultaneously be arranged to drive a disc 38 carrying an indicating device 39 near its periphery and in proximity to a stationary scale 40. By this means the brushes 36 and 37 may be positioned with respect to the conducting segment 35 in such a manner that the beginning of the transmitted signal occurs when the indicator 39 is opposite the zero mark on the scale 40.

Having now described my invention, I claim:

In a sound ranging system having a driver including an oscillator tube, means for varying the frequency of the oscillator comprising a tuning inductance in the oscillator plate circuit, a magnetic core for said inductance, a coil wound on said core, a condenser and means for discharging said condenser through said coil.

BERTRAM M. HARRISON.